United States Patent
Ragsdale et al.

(10) Patent No.: US 10,614,423 B2
(45) Date of Patent: Apr. 7, 2020

(54) EMAIL NOTIFICATION SYSTEM

(71) Applicant: VMware, Inc., Palo Alto, CA (US)

(72) Inventors: Ian Ragsdale, Atlanta, GA (US); Neal Foster, Austin, TX (US); Evan Hurst, Atlanta, GA (US); Ruben Nieves, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 159 days.

(21) Appl. No.: 15/867,597

(22) Filed: Jan. 10, 2018

(65) Prior Publication Data
US 2019/0213553 A1   Jul. 11, 2019

(51) Int. Cl.
| | | |
|---|---|---|
| *G06Q 10/10* | (2012.01) | |
| *H04L 9/32* | (2006.01) | |
| *H04L 29/08* | (2006.01) | |
| *H04L 29/06* | (2006.01) | |
| *H04L 12/58* | (2006.01) | |

(52) U.S. Cl.
CPC ......... *G06Q 10/107* (2013.01); *H04L 9/3213* (2013.01); *H04L 51/00* (2013.01); *H04L 63/0823* (2013.01); *H04L 67/26* (2013.01)

(58) Field of Classification Search
CPC ............ H04L 63/0281; H04L 63/0884; H04L 63/0823; H04L 37/28; H04L 37/2833; H04L 41/026; H04L 65/4015; H04L 65/4023; H04L 49/90; H04L 9/3213; H04L 9/3263; H04L 67/26; G06Q 10/107
See application file for complete search history.

(56) References Cited

U.S. PATENT DOCUMENTS

| | | | |
|---|---|---|---|
| 2010/0313250 A1* | 12/2010 | Chow | ............. H04L 63/08 726/5 |
| 2011/0040895 A1 | 2/2011 | Griffin | |
| 2011/0276683 A1 | 11/2011 | Goldschlag | |
| 2012/0272304 A1 | 10/2012 | Liao | |
| 2012/0303774 A1 | 11/2012 | Wilson | |
| 2012/0324041 A1 | 12/2012 | Gerber | |
| 2013/0144755 A1 | 6/2013 | Mowatt | |

(Continued)

OTHER PUBLICATIONS

International Search Report dated May 1, 2019 for International Application No. PCT/US2019/012942.

(Continued)

*Primary Examiner* — Kevin Bechtel
*Assistant Examiner* — Vu V Tran
(74) *Attorney, Agent, or Firm* — Clayton, McKay & Bailey, PC

(57) ABSTRACT

Examples described herein include systems and methods for providing push notifications to a third-party application executing on a client device. An example can include encrypting user credentials, generating a callback Uniform Resource Locator ("URL") with at least a portion of the encrypted credentials embedded into the URL, and requesting notifications from an email service to be provided at the callback URL. Upon receiving a notification at the callback URL, a system component can decrypt the credentials within the URL using a private key and log into the email account using those decrypted credentials. The system component can then generate a push notification based on any changes found in the email account and cause the notification to be delivered to the third-party application on the client device.

20 Claims, 10 Drawing Sheets

(56) References Cited

U.S. PATENT DOCUMENTS

| | | |
|---|---|---|
| 2013/0318348 A1 | 11/2013 | Lebron et al. |
| 2015/0082212 A1 | 3/2015 | Sharda |
| 2015/0195239 A1 | 7/2015 | Firstenberg et al. |
| 2015/0237151 A1 | 8/2015 | Lau |
| 2015/0379284 A1 | 12/2015 | Stuntebeck |
| 2016/0028677 A1* | 1/2016 | Narasimhan et al. .. H04L 51/22 709/203 |
| 2016/0028840 A1 | 1/2016 | Krishnan et al. |
| 2016/0308863 A1 | 10/2016 | Burch et al. |
| 2016/0323226 A1* | 11/2016 | Stuntebeck ............. H04L 51/24 |
| 2017/0093784 A1 | 3/2017 | McKay et al. |
| 2017/0230825 A1* | 8/2017 | Counterman ......... H04W 12/06 |
| 2018/0129546 A1* | 5/2018 | Mullins .................. G06F 9/542 |
| 2018/0167372 A1 | 6/2018 | Voicu |

OTHER PUBLICATIONS

International Search Report dated Jun. 12, 2019 for PCT/US2019/021210.

* cited by examiner

EMAIL NOTIFICATION SYSTEM

CROSS-REFERENCE TO RELATED APPLICATIONS

This application is related to U.S. patent application Ser. No. 15/867,586, entitled "EMAIL NOTIFICATION SYSTEM", and to U.S. patent application Ser. No. 15/867,590, entitled "EMAIL NOTIFICATION SYSTEM".

BACKGROUND

Push notifications provide timely notifications to users without requiring the receiving device to connect to a server and request a status update. Push notifications save battery life for the receiving device, as connecting to a server takes more processing power than simply receiving the pushed notification. In the case of email communication, notifications can be pushed from a backend service that monitors a user's email inbox and detects incoming email messages.

The backend services that support push notifications are typically designed to support native applications, such as a native email client, that can interact with and take advantage of operating-system features. Complications arise when using third-party applications that cannot take advantage of certain operating-system features, and therefore do not receive push notifications in the traditional manner. These complications compound when an enterprise implements an Enterprise Mobility Management ("EMM") or Mobile Device Management ("MDM") system, where the EMM provider can be managing thousands of email accounts across multiple different systems, servers, and backends. Today's operating systems simply cannot accommodate push notifications in that scenario.

EMM providers can work around the problems above by directly accessing users' email accounts to monitor changes and then send notifications as desired. However, doing so requires an EMM provider to either utilize a service account with authority to access multiple users' accounts, or store email credentials for each of the user accounts. Both of these approaches can create security concerns, as the users' credentials are susceptible to being stolen by anyone with sufficient access to the EMM provider's system.

As a result, a need exists for systems and methods that allow an EMM provider to access user email accounts and coordinate push notifications without the EMM provider storing credentials for the email accounts that could allow hackers to gain access.

SUMMARY

Examples described herein include systems and methods for providing push notifications to a third-party application executing on a client device. In a first example, a notification server receives a request from a client device. The request can include a user identification associated with the user, such as a hash of an email address associated with the user of the client device or the email address itself. The request can also include user credentials encrypted with a public key. The credentials can be associated with the user's email account at an email service. In one example, the request also includes a push-notification-service token that can be provided to a push notification service in order to deliver notifications to the device.

This example method can also include generating a callback Uniform Resource Locator ("URL"). The callback URL can include at least a portion of encrypted user credentials within the URL. The notification server can instruct the email service to contact the callback URL to report a change in the email account. The change could be a new email or it could be an alert, such as a password-expiration warning. In response to receiving contact at the callback URL, the notification server can decrypt the embedded encrypted user credentials using a private key corresponding to the public key used to encrypt the credentials.

In response to the email service contacting the notification server at the callback URL, the notification server can fetch email information from the email service. Fetching the email information can include, for example, accessing the email service using decrypted user credentials obtained by decrypting the encrypted user credentials embedded in the callback URL.

The method can also include causing a push notification to be transmitted to the client device. The push notification can include at least a portion of the fetched email information, such as a subject line and a sender, and potentially a portion of the email body as well. The notification server can push the notification directly to the device in some examples, while in other examples the notification server can instruct a push notification service to transmit the push notification. The instruction can include providing a push-notification-service token to the push notification service.

A second example method focuses on the operations of the client device. The method can include requesting registration at a notification server and providing a user identification. The method can also include receiving a public key from the notification server. The public key can be part of a private-public key pairing. The private key can be stored at the notification server and associated with the user identification.

The client device can use the public key to encrypt user credentials associated with an email service. The credentials can be a username and password pairing, a certificate, or a token, such as an OAuth token. The device can then transmit the encrypted credentials to the notification server. Those encrypted credentials can be decrypted by the notification server to provide the server with access to the email service. At least a portion of the encrypted credentials can be embedded into a callback URL generated by the notification server. The server can instruct the email service to access the callback URL in response to a change in an email folder associated with the user, such as when a new email is received.

The method can also include receiving, at the client device, a notification in response to the email service accessing the callback URL. The notification can be delivered directly from the notification server, or it can be delivered by an intermediary server that receives the notification from the notification server. The client device can access the email service in response to receiving the notification.

A third example method focuses on interactions between a notification server and an email server of an email service. The method can include generating a callback URL that includes at least a portion of a user's email credentials in encrypted form. As mentioned above, the credentials can include a username and password pairing, a certificate, or a token. The method can also include requesting that the email server provide notifications for the user's email account. The request can specify that notifications for the user's email account be provided at the callback URL.

The method can include receiving a notification from the email service at the callback URL. The callback URL can include a user identification that allows the notification server to identify a private key associated with the user. The private key can be used to decrypt the encrypted credentials embedded in the callback URL. After decrypting the credentials, the notification server can fetch email information from the email service using the decrypted credentials. The unencrypted credentials can be deleted from the notification server after fetching the email information.

The notification server can generate a device notification based on the fetched email information and transmit it to the user's device. The notification can include at least a portion of the fetched email information, such as a subject line and sender of a newly received email. In some examples, the notification server can instruct another server or service to generate and/or send the notification.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing push notifications to a third-party application executing on a client device. The client device can interact with a notification server to securely provide credentials for a user's email account. The notification server can use the credentials to subscribe to the email account and request updates regarding any changes to the account, such as a newly received email, to be provided at a callback URL. The callback URL can include an encrypted version of the user's credentials and an identification of the user. The notification server can select an appropriate decryption key based on the user identification and use it to decrypt the credentials embedded in the callback URL. The decrypted credentials can be used to log in to the user's email account and retrieve any necessary information to be provided in a notification to the client device.

Figure 1:
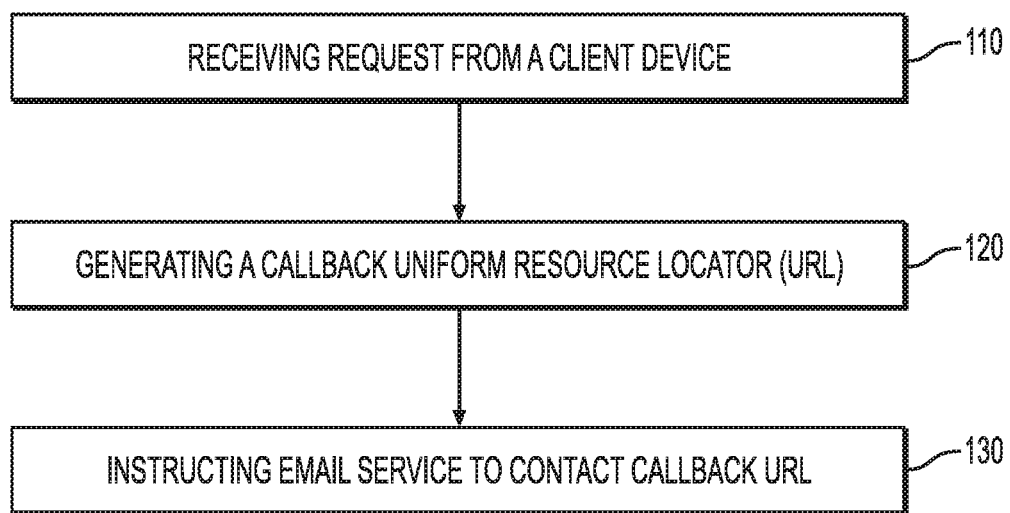
FIG. 1 is a flowchart of an exemplary method performed by a server for providing push notifications to a client device using a callback URL.
Figure 2:
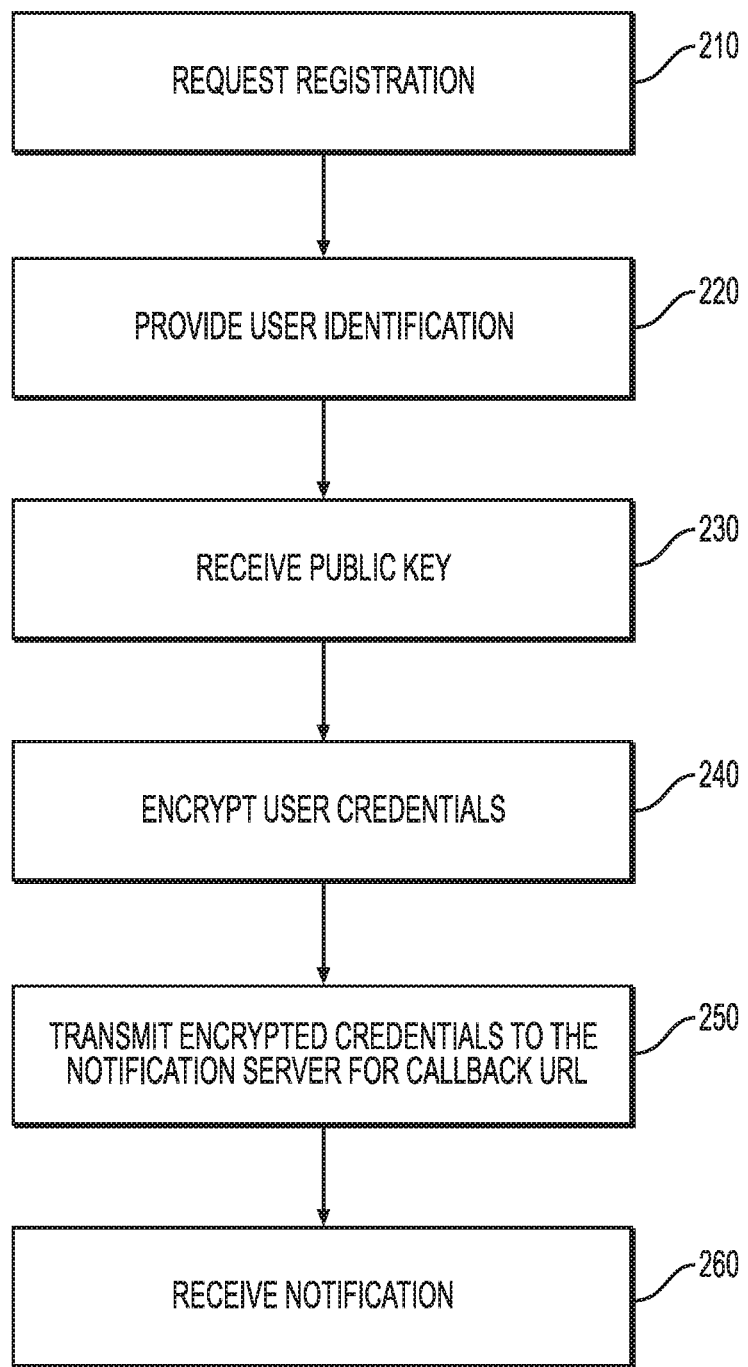
FIG. 2 is a flowchart of an exemplary method performed by a client device for registering the client device into a notification service for receiving push notifications.
Figure 3:
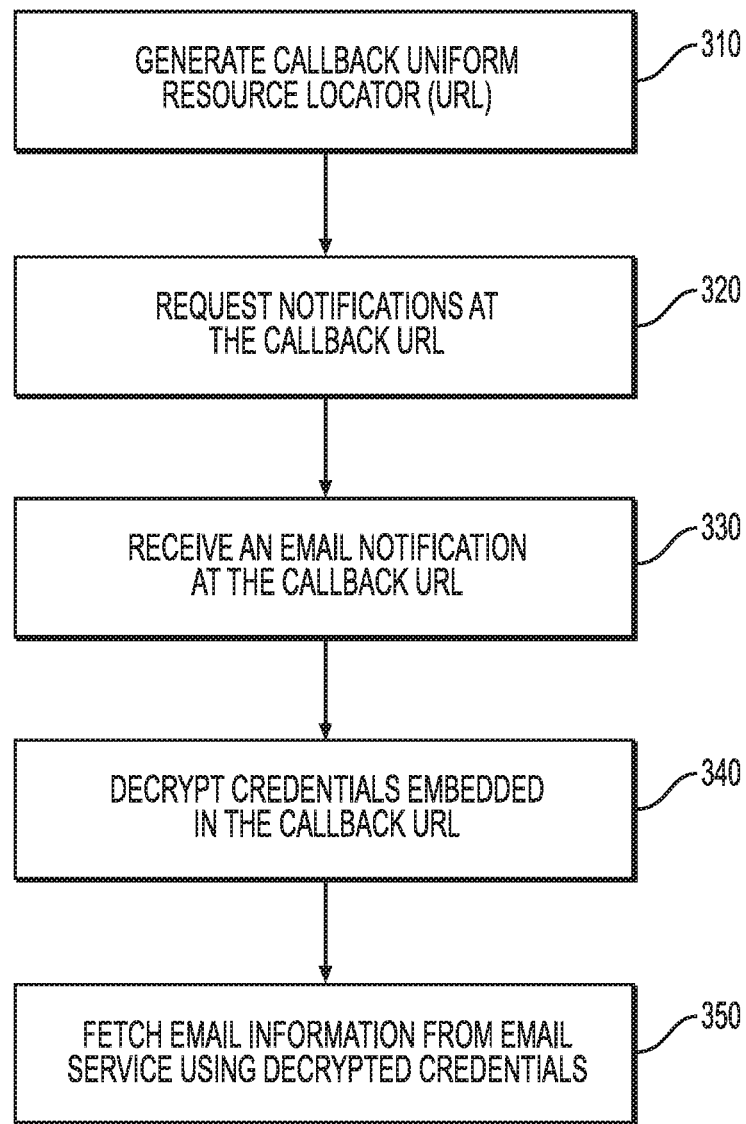
FIG. 3 is a flowchart of an exemplary method performed by a notification server for subscribing to an email service for receiving email updates at a callback URL.
Figure 4:
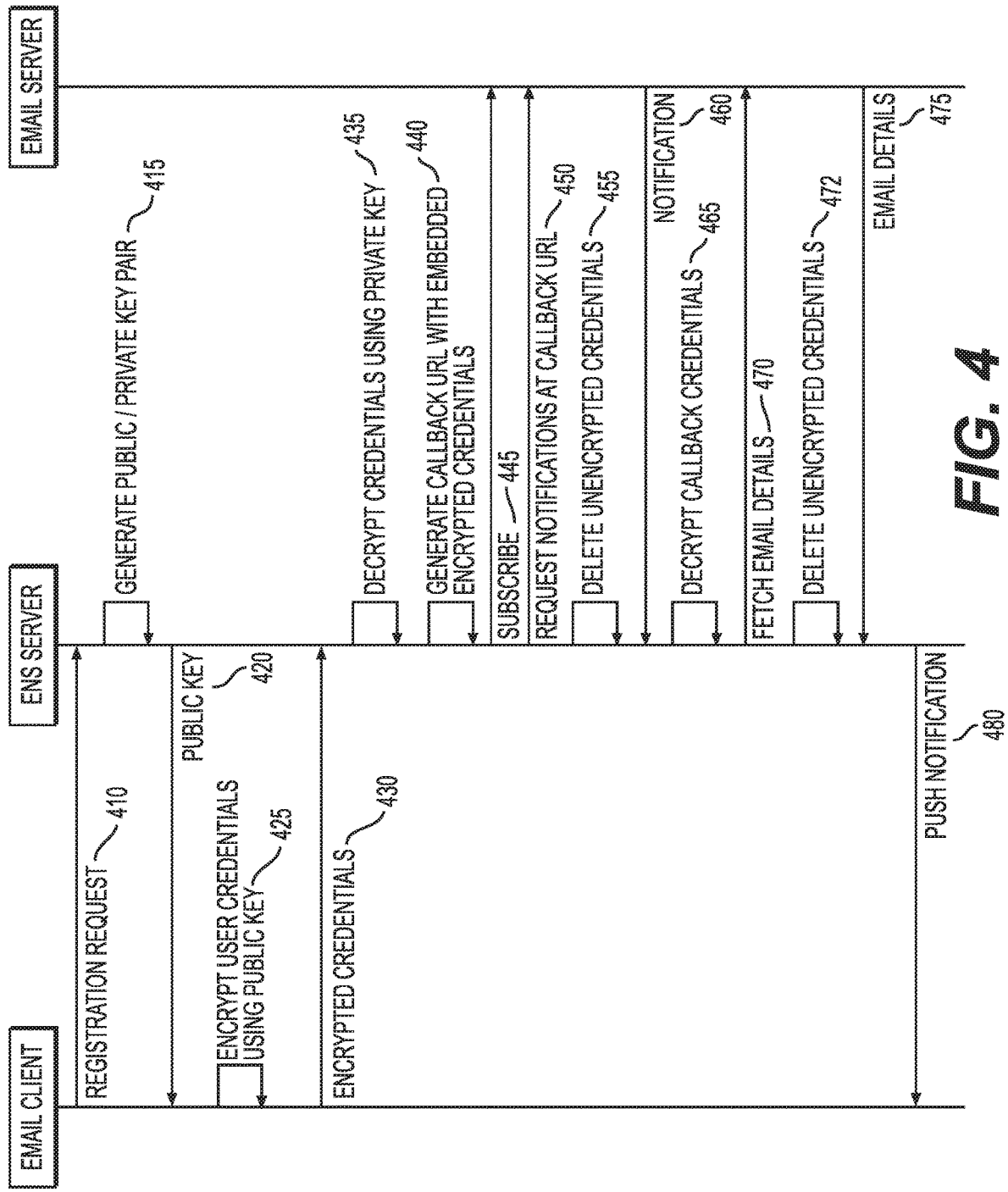
FIG. 4 is a flowchart of an exemplary method for providing push notifications to a client device.
Figure 7:
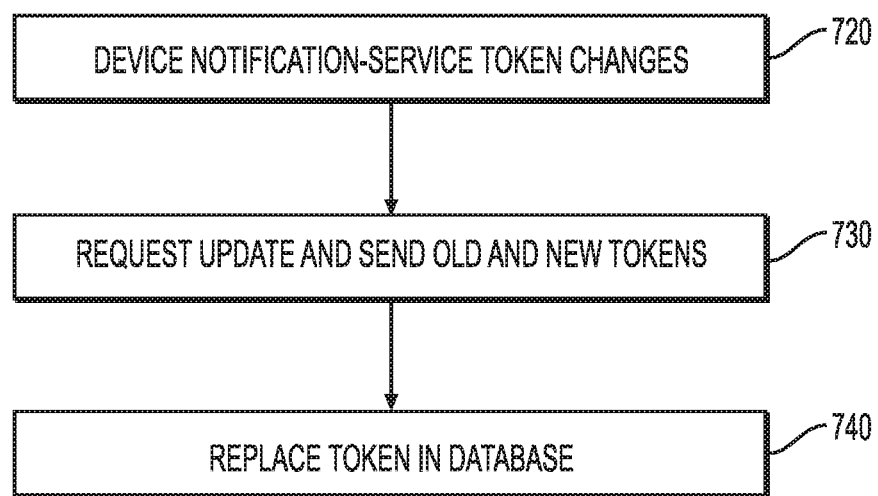
FIG. 7 is a flowchart of an exemplary method for handling token changes for a client device receiving push notifications.
Figure 8:
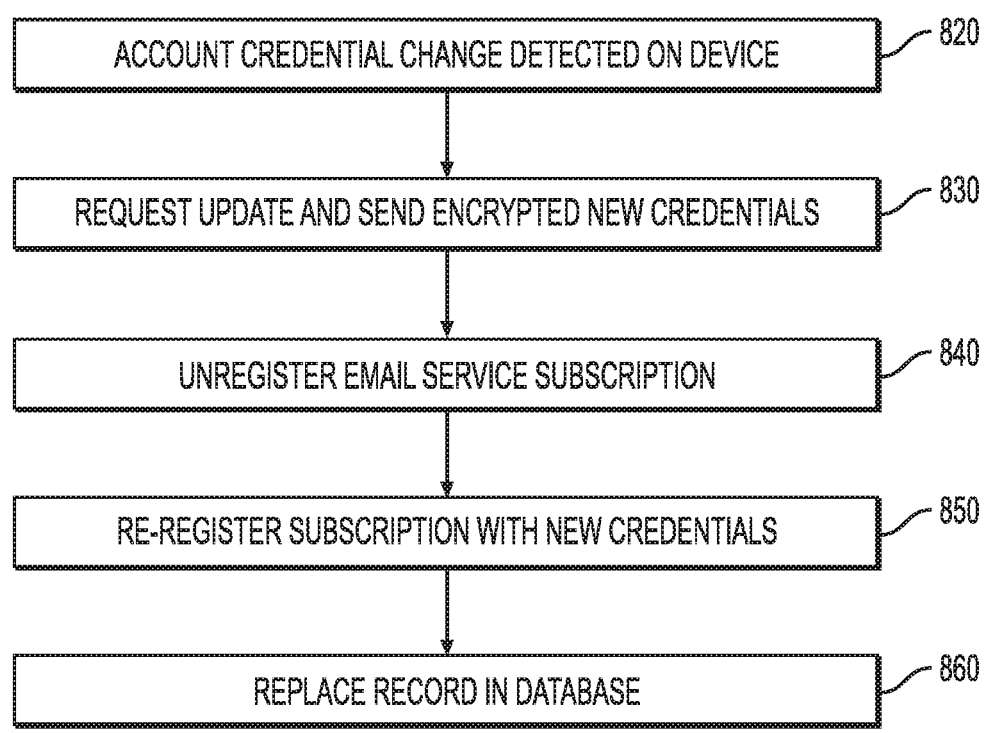
FIG. 8 is a flowchart of an exemplary method for handing credential changes for a client device receiving push notifications.
Figure 9:
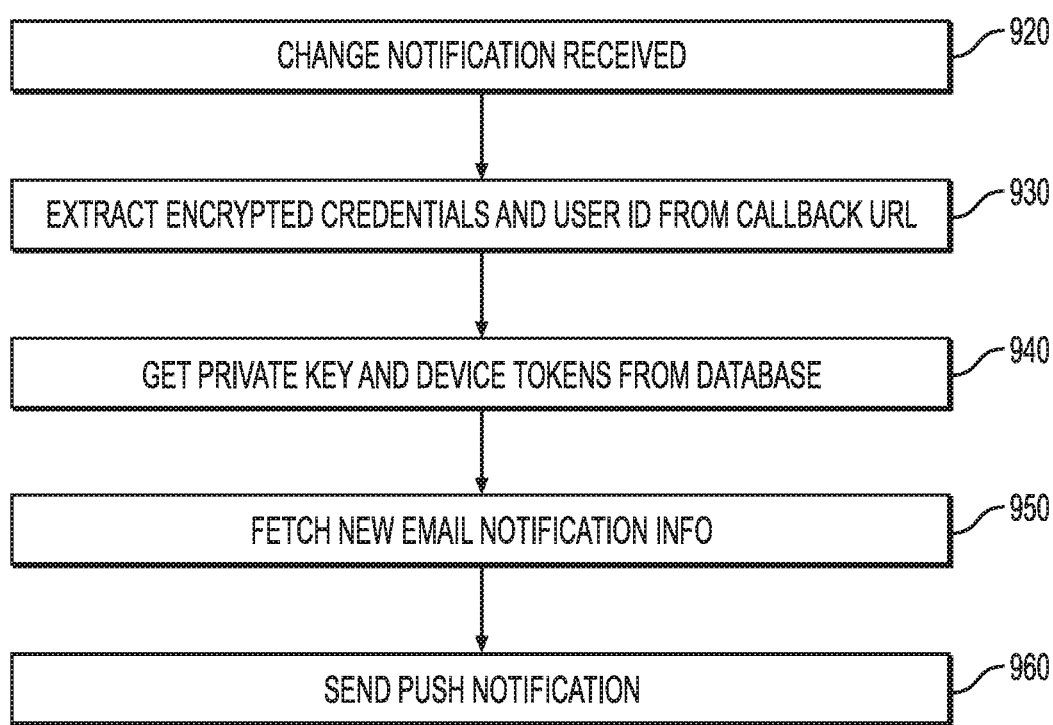
FIG. 9 is a flowchart of an exemplary method for retrieving email information and sending a push notification to a client device.
Figure 10:
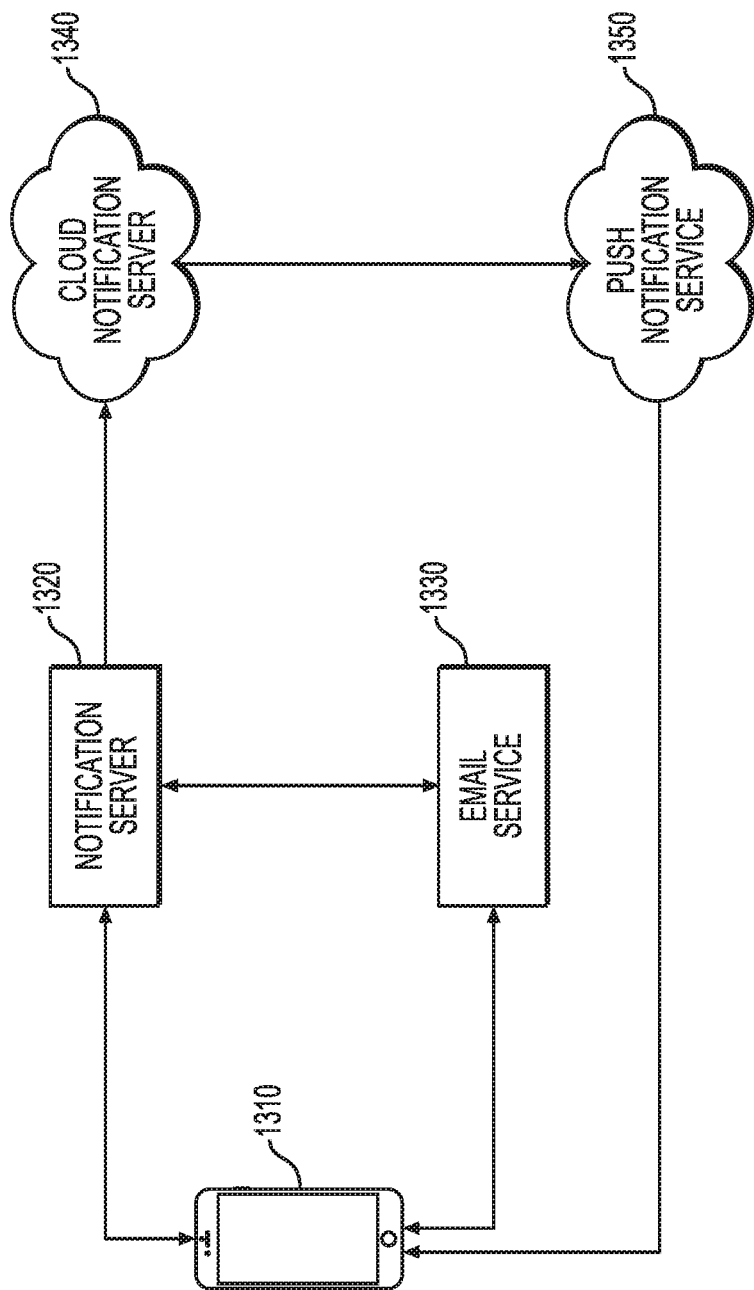
FIG. 10 is an illustration of example system components for providing push notifications to client devices.

FIG. 1 provides a high-level flowchart including interactions between a notification server and a client device and email service. FIG. 2 provides a flowchart including more detailed interactions between the client device and the notification server, while FIG. 3 provides a flowchart including interactions between the notification server and the email service. FIG. 4 provides a flowchart of the overall process including additional details. The process of registering a device to receive push notifications from the notification server is detailed in FIG. 5, while the process of unregistering is covered by FIG. 6. FIG. 7 relates to a process for handling token changes when the client device authenticates to the email service with a token. FIG. 8 similarly relates to a process for handling credential changes. FIG. 9 provides a flowchart for handling a change notification received at the notification server from the email service. FIG. 10 provides an illustration of system components for accomplishing the various methods disclosed herein.

FIG. 1 provides a flowchart of a high-level example method executed by a notification server. At stage 110 of the method, the notification server can receive a request from a client device. The request can be sent from the client device and can originate from an application executing on the client device. In one example, the application is a third-party email client, such as VMWARE's BOXER application. The request can indicate that the device is requesting to receive notifications, such as email notifications, through the notification server. The request can include identification information that allows the notification server to identify a particular account, such as an email account. For example, it can include a user ID, an email address, a hash of an email address, or some other form of identification.

The request can also include user credentials associated with an email account of the user. The credentials can be a username and password combination for the email account in some examples. The credentials can also include a certificate or a token, such as an OAuth token, for accessing the user's email account. Regardless of their type, the user's credentials can be encrypted with a public key provided by the notification server.

At stage 120, the notification service executing on the notification server can generate a callback URL. The callback URL can indicate the address of the notification server or service, so that the email server can communicate with the notification service. The callback URL can also include at least a portion of the encrypted user credentials embedded within the URL. In some examples, the entirety of the encrypted user credentials is embedded into the URL. The processes of generating and utilizing the callback URL are described in more detail in conjunction with various other figures, such as FIGS. 4, 5, and 9-12.

At stage 130, the notification service can instruct the email service to contact the callback URL in the event of a change in the user's email account. To gain access to the email service, the notification service can decrypt the encrypted credentials using a private key corresponding to the public key used for encryption. In this way, neither the email service nor the notification service maintains the full credentials in readable form.

The notification service can request contact from the email service in the event of a change to the user's email account, including, for example, a new email, read receipt, or meeting invitation received at the email account, an email being removed from the account or moved to a different subfolder, or any other similar type of change. The change could also be an alert that requires badging at the user device. For example, the email service can indicate a number to be displayed on an application icon associated with the email client on the user's device. The number can indicate a number of unread message, for example. The email service can be configured to access the callback URL in response to detecting any change in the user's email account. The notification server can take further actions at that point, as described in more detail with respect to FIGS. 3, 4, and 9.

Turning to FIG. 2, various steps of an example method are depicted in a flowchart. Stage 210 can include requesting registration with a notification server. The request can be sent from the client device, as explained previously. The request can include identification information that allows the notification server to identify a particular account, such as an email account. For example, it can include a user ID, an email address, a hash of an email address, or some other form of identification. The user identification can be sent from the client device to the notification server at stage 220.

At stage 230, the client device receives a public key from the notification server. The public key can be part of a public-private key pairing. For example, the notification server can generate a key pair where the public key is used for encryption and the private key, which differs from the public key, is used for decryption of information encrypted with the matching public key. The keys can be generated at the notification server. While the public key is provided to the client device at stage 230, the private key can be stored at a secure location accessible only to the notification server.

At stage 240, the client device can use the public key to encrypt user credentials for accessing an account, such as an email account, identified at stage 220. For example, the client device can encrypt a username and password combination for the email account. In some examples, the client device can alternatively, or additionally, encrypt other credentials. For example, the device can encrypt a certificate or a token, such as an OAuth token, for accessing the account. The encrypted credentials can be transmitted to the notification server at stage 250. The notification server can use the encrypted credentials and user identification to generate a callback URL. The processes of generating and utilizing the callback URL are described in more detail in conjunction with various other figures, such as FIGS. 4, 5, and 9-12.

At stage 260, the client device receives a notification, such as an email notification from the notification server. An email notification can include any information relevant to a user's email account, such as an indication that a new email, read receipt, or meeting invitation was received. The notification can also include additional information about the indication, such as a subject line, portion of the body of an email, or key details from a meeting invitation. The notification server performs various tasks in order to deliver the notification to the client device, and these tasks are described later in this disclosure, such as in conjunction with FIG. 9.

After receiving the notification, the client device can access the email service directly and download the email, read receipt, meeting invitation.

FIG. 3 provides a flowchart depicting an example method of providing push notifications to a client device. The example method of FIG. 3 begins after the notification server has received encrypted credentials from a client device, along with a user identification associated with the credentials. At stage 310 of the method, the notification server can generate a callback URL. The callback URL can be generated by selecting a URL associated with the notification server and embedding a user identification and at least a portion of the encrypted credentials into the URL.

For example, the notification server can initially select a URL such as https://notifications.vmware.com/api. In some examples, the selected URL contains fields that need to be completed in order for the URL to be fully functional. For example, a user identification field such as "id=x" can be included in the URL. Similarly, a credential field such as "c=y" can be included in the URL. The example URL containing these fields can read: https://notifications.vmware.com/api?id=x&c=y. To complete the generation of the URL for a particular user, the notification server can substitute a user identification for "x" and substitute encrypted credentials for "y". An example of the resulting callback URL using a user identification of "12345" and an encrypted credential of "012345ABCDEF" would therefore read: https://notifications.vmware.com/api?id=12345&c=012345ABCDEF.

At stage 320, the notification server can request notifications from an email service at the callback URL. To do so, the notification server can decrypt the encrypted credentials received from the client device using a private key. The private key can correspond to the use of the client device, as discussed with respect to FIG. 2. After obtaining the decrypted credentials, the notification server can access the email service using those credentials and request notifications at the callback URL. For example, the notification server can use an Application Programming Interface ("API") call or another access method, such as a webhook, to instruct the email service to send a change notification in the event of any changes to the user's email folder. These changes can include, for example, receiving a new email, read receipt, or meeting invitation, removing an email from a folder, moving an email from one subfolder to another, or any other change. The email service can be configured to access the callback URL in response to detecting any change in the user's email account.

At stage 330, the notification server receives a change notification at the callback URL. The change notification can indicate a change to the user's email folder. The change notification itself need not include an explanation or indication of that type of change; rather, the change notification can simply provide a notification that some change has been made. In some examples, however, the change notification can include a description of the type of change, for example by including an indication of a new email in the change notification.

At stage 340, the notification can decrypt the credentials embedded in the callback URL. This stage can include extracting user identification information from the callback URL. For example, if the callback URL includes a user identification portion, such as "id=1234," the notification server can determine that the user identification is "1234." The notification server can then cross-reference this identification with a table that identifies a private key corresponding to user "1234." The table can be stored at the notification server or at another storage location, such as an external database accessible to the notification server. The notification server can retrieve the private key corresponding to the user identification information and use the private key to decrypt the credentials embedded in the callback URL.

Having decrypted the credentials in the callback URL using the appropriate private key, the notification server can then fetch email information from the email service at stage 350. For example, the notification server can gain access to the user's email account by providing the unencrypted credentials to the email service. The notification server can then determine what change, or changes, prompted the change notification from the email service. These changes can then be captured and provided to the user by sending a notification to the client device, as discussed in more detail below in conjunction with FIG. 4.

FIG. 4 provides a flowchart of an example method of providing push notifications that includes additional details. The flowchart shows interactions between an email client executing on a client device, an Email Notification System ("ENS") server (also referred to as a "notification server" throughout this disclosure), and an email server.

Stage 410 of the method includes the email client sending a registration request to the ENS server. The registration request can include an API token for authenticating with the API of the ENS server. For example, the API token can be sent as a header parameter on outgoing connections from the client device. The API token can be distributed to a client device from a management server, in some examples. The management server can be part of an EMM system and determine whether the client device is compliant with any relevant compliance rules and policies before issuing the API token.

The management server can also provide an API key to the ENS server for authenticating a matching API token. The ENS server can store a table of API keys that is checked against a whitelist of authorized API keys. If a client device falls out of compliance, the management server can remove the corresponding API key from the whitelist. In that example, when the non-compliant device attempts to access the ENS server, the API authentication will fail and the ENS server will not communicate with the client device. In some examples, API keys are set to expire after a predetermined amount of time, at which point the ENS server needs to refresh the API key statuses. The management server can refresh the statuses by sending a new whitelist, sending updates to the whitelist, or confirming that an existing whitelist is correct. The request at stage 410 can also include a user identification, such as an email hash, email address, or user ID number.

If the API token sent by the client device is authorized by the ENS server, then at stage 415 the ENS server can generate a public-private key pairing. A unique key pairing is generated for each user. The public key provides information sufficient to encrypt data, but does not provide information for decrypting that data. As a result, interception of the public key does not threaten data security. The private key can be stored at the ENS server, thereby avoiding a transmission of the private key, which could be susceptible to unwanted interception.

The public key can be provided to the email client at stage 420. The private key can be stored in a table kept by the ENS server. The table can include various fields, such as a user identification field, a public key field, a private key field, a subscription field indicating whether the device is subscribed for push notifications, and other fields discussed later.

At stage 425, the email client can cause the user's email credentials to be encrypted using the public key. The encrypted credentials can be transmitted to the ENS server at stage 430. Stage 430 can also include sending a user identification as well as the API token, depending upon the settings at the ENS server. This stage can also include sending a notification-service token. The notification-service token is described in more detail later, but generally acts to authenticate a particular application and a particular device to a push notification service (also referred to herein as a "notification service"). The push notification service can be used later in the method when the ENS server wishes to send a push notification remotely to the client device.

Having received the encrypted credentials at stage 430, the ENS server can look up the user in the stored table using either the user identification, API token, or both. The ENS server can then identify the private key stored in the table for that user and use the private key to decrypt the encrypted credentials at stage 435.

Stage 440 can include generating a callback URL in the manner described previously, including embedding at least a portion of a user identification and at least a portion of the encrypted credentials into the callback URL. Stage 440 can occur before, during, or after stage 435. For example, the ENS server can decrypt the credentials at stage 435 after generating the callback URL at stage 440, and then use the decrypted credentials in stage 445.

At stage 445, the ENS server can subscribe to the email server. This stage can include discovering the email server endpoint based on the credentials provided by the email client. For example, the ENS server can auto-discover the email service based on the domain portion of the user's email account. The ENS can also identify the email service based on an indication of a version, such as an EXCHANGE version, received from the client device for auto-discovery of the email service. The ENS server can subscribe to the email server using a webhook link that contains the encrypted credentials. The webhook can be a ENS-server-defined HTTP callback that is triggered by a change in an email folder associated with an email account and stored by the email server. At stage 450, the ENS server can define the HTTP callback to be the callback URL generated at stage 440.

At stage 455, the ENS server can delete the unencrypted user credentials from the server as a security measure. This stage can also include deleting the encrypted user credentials extracted from the callback URL. No user credentials would persist on the server at that time. If a third party were to hack the ENS server and extract its information, they would not be able to capture any user credentials—one of the goals of the subject matter described herein.

At stage 460, the email server determines that a change has occurred in the email folder of the user's email account, and accordingly makes an HTTP request at the callback URL associated with that account. The request is received by the ENS server at the callback URL. The ENS server extracts a user identification from the callback URL, as well as the encrypted credentials embedded in the URL. The ENS server can use the user identification to look up the user in a stored table and obtain the corresponding private key for decrypting the credentials. At stage 465, the ENS server can decrypt the credentials using the private key.

At stage 470, the ENS server can use the credentials to access the user's email account at the email server. For example, the ENS server can use a different encryption format to encrypt the user's credentials when forming a request to access the user's email account. The email server can receive the user's credentials, decrypt them according to a predetermined decryption scheme, and then grant access based on the credentials. The ENS server can then delete the credentials again at stage 472. This can include deleting the unencrypted credentials as well as any versions of the encrypted credentials. In some examples, this stage is performed directly after sending the request for email details at stage 470. This prevents the credentials from being stored at the ENS server.

Email details, such as information regarding a newly received email, can be transmitted at stage 475. The ENS server can determine whether a notification should be pushed to the client device based on the email details. For example, if the email details simply indicate that an email has been deleted, the ENS server can choose not to generate a push notification. On the other hand, if a new email has been received and appears to not be spam, the ENS server can generate a notification.

At stage 480, a push notification is transmitted to the email client. In some examples, the ENS server can push the notification directly to the device. In other examples, the ENS server can use a notification service, such as the APPLE NOTIFICATION SERVICE ("APNS"). The notification service can be a server, or network of servers, provided by an OEM and configured to deliver notifications to specific applications on specific devices. The notification service can utilize notification-service tokens, such as APNS tokens, to authenticate the applications and devices. The notification service can be selected by the notification server based on the device type of the user device running the email client, in an example.

In some examples, the notification service only authorizes certain providers to generate push notifications. For example, a provider can be required to provide requests in a particular format, encrypt the requests in a particular manner, and include a notification-service certificate or token with the requests. In some examples, the ENS server can act as an authorized provider that can utilize the notification service. In other examples, the ENS server provides the request to an intermediary server, such as a cloud notification server, that is authorized as a provider. A system having these components is illustrated in FIG. 13. Stage 480 can therefore include pushing a notification directly from the ENS server to the client device, instructing a notification service to push the notification, or instructing an intermediary server to instruct a notifications service to push the notification.

Figure 5:
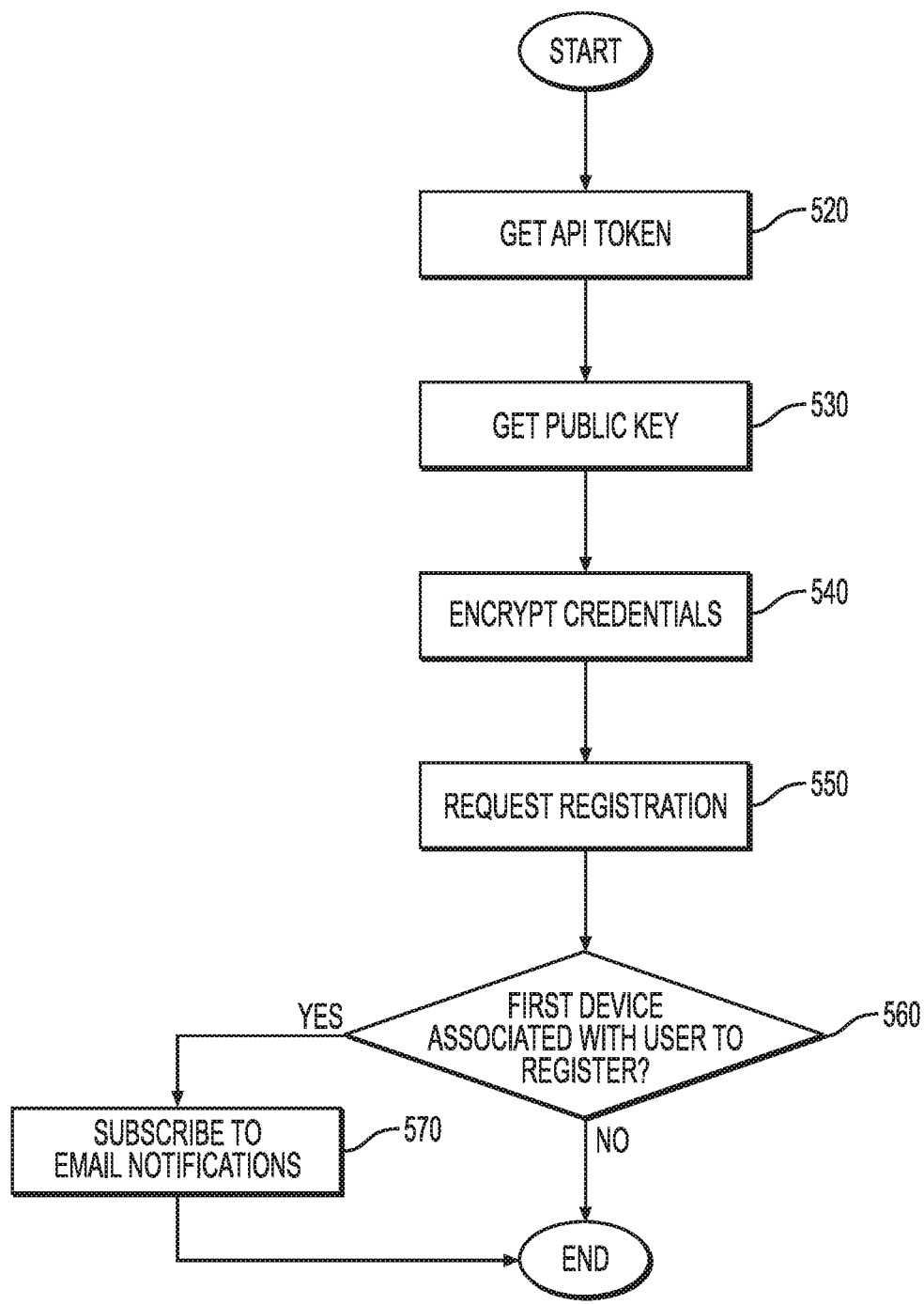
FIG. 5 is a flowchart of an exemplary method for registering a client device into a notification service for receiving push notifications.

FIG. 5 provides a flowchart of an example method for registration of a client device with a notification server, such as the ENS server of FIG. 4. The method begins stage 520, where the client device obtains an API token. The API token can be provided to the client device from a management server that monitors and confirms device compliance. In some examples, the API token is provided to the notification server which then sends the token to the client device. In other examples, the API token is provisioned directly to the client device from the management server.

Stage 530 includes obtaining a public key at the client device. This stage can include sending an API call to the notification server to obtain the public key. The API call can include a user identification, such as an email address, email hash, or user identification number. The notification server can create a new record, in a table or other database, for the user identification. The notification server can also generate a public-private key pairing and include those keys as entries in the table or database associated with the user identification. The notification server can then respond to the request by providing the public key to the client device.

At stage 540, the client device encrypts the user's email credentials. The client device can use the public key to perform the encryption, as described previously. At stage 550, the client device requests registration with the notification server. The request can be an API call that includes various fields. For example, the request can include a user identification field, which can be an email hash. The request can also include the full email address to assist the notification server in auto-discovering the associated email service.

The request can also include a credentials field. The credentials field can include the encrypted credentials, the public key, a notification-service token, or some combination thereof. The request can also include an application ID that identifies the particular application, such as a third-party email client, making the request. The request can also include an email-server-version field that indicates a version of an email server associated with the email account, such as an EXCHANGE version. The request can further include a force field that, if utilized, can force the server to perform registration even if the requesting client was already registered. Finally, the request can include a sound field that includes a sound name to be returned back with the notification payload and that instructs an application to produce a certain sound in association with the notification.

At stage 560, the notification server can determine whether the requesting client device is the first device to be associated with the requesting user. For example, a user might install a third-party email client on two devices. If the first device has already performed registration with the notification server, then the registration process can end because the registration would be duplicative for the second device. In that example, the method can end at stage 580. The notification service can push the same notifications to multiple devices without further registration since the notification service is already subscribed to the email service for that user.

If, however, the requesting device is the user's first device to request registration, then the method can continue to stage 570. At stage 570, the notification server can subscribe to the email service. This process can include generating a callback URL and establishing a webhook link that defines an HTTP callback for the email service (and that particular user's email account) to be the callback URL, as described above with respect to stages 440-450 of FIG. 4. After the subscription is established for that user and client device, the method can end.

Figure 6:
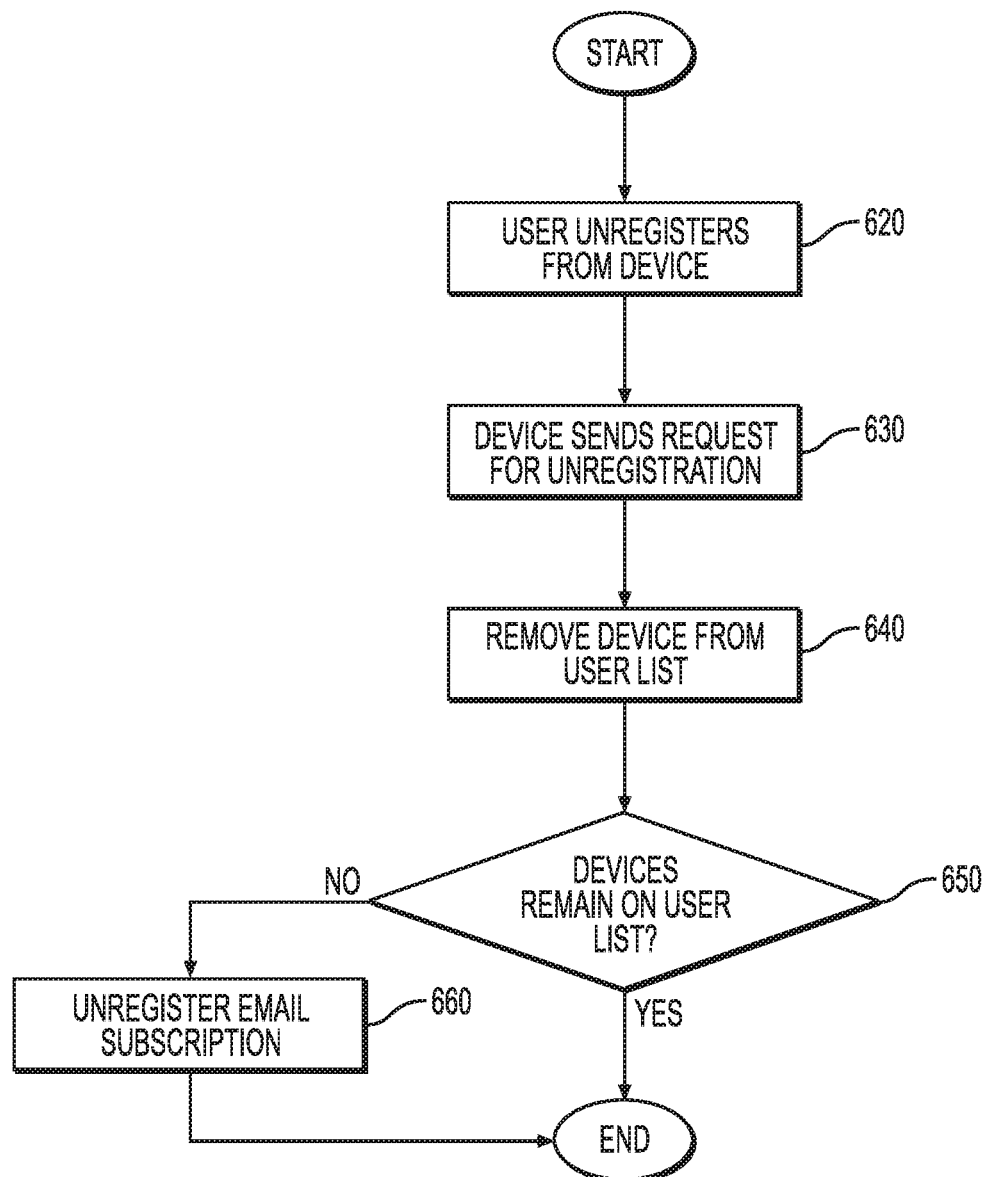
FIG. 6 is a flowchart of an exemplary method for unregistering a client device from a notification service for receiving push notifications.

FIG. 6 is a flowchart of an example method for unregistering a client device from a notification server. A user can unregister a client device by, for example, deleting their email account information from an email client executing on a device. As another example, the user can be unregistered if the device is redistributed to another employee of an enterprise. In yet another example, the user can be unregistered if a management server that monitors compliance determines that the device is no longer compliant and restricts the device. In all of these potential scenarios, the notification server should not continue to send notifications to that device. Instead, the method of FIG. 6 can be implemented.

The method begins at stage 620, where the user unregisters from the device as explained above. The client device can post an API call to the notification server requesting to unregister at stage 630. The request to unregister can include a user identification, such as an email hash string or identification number, as well as a notification-service token. The notification-service token can be encrypted with the public key described previously.

At stage 640, the notification server can search for the record associated with the user identification and remove the device from the list of associated devices. The record can be updated to reflect the unregistered state of the device. At stage 650, if the user remains registered with the notification server through other client devices, the notification server can preserve the record and end the process. If, however, no other devices remain registered with the notification server, then at stage 660 the notification server can unregister the subscription with the email service. This can include, for example, deleting the webhook link established for the email service. After unregistering the subscription, the de-registration process can end.

FIG. 7 flowchart of an example method for handling notification-service token changes for a client device receiving push notifications. As mentioned above, a notification service can require a notification-service token in order to provide push notifications to a client device. For example, APPLE's notification service, APNS, requires an APNS token. From time to time, these tokens can change or expire. The example method of FIG. 7 relates to updating the records at the notification server to reflect the new notification-service token.

At stage 720, a notification-service token associated with the client device changes. The change can be a result of the token expiring or the notification service otherwise requiring a change. At stage 730, the client device can request an update by posting an API call to the notification server. The API call can include a user identification along with both the old notification-service token and new notification-service token, both of which can be encrypted with the public key previously provided by the notification server.

At stage 740, the notification server can locate a record associated with the user identification. The old notification-service token can be located and replaced with the new notification-service token. The new notification-service token will then be included in future requests from the notification server to the notification service (or to an intermediary server that forwards the request to the notification service).

While notification-service tokens can be changed, a user's email credentials can similarly change from time to time, for various reasons. For example, some email services require a user to select a new password after a predetermined time period of using the same password. In other examples, a user may elect to change their password for security reasons or because the password was discovered by another party. When a user is registered for notifications from a notification server and the user's credentials change, the notification server can no longer retrieve email information and generate notifications. FIG. 8 focuses on a process for updating the email credentials to continue uninterrupted notification service.

At stage 820, an account credential change is detected on the client device. The credential change can be detected by the email client, such as by detecting when a user edits the settings of the email client to reflect a new username or password. The email client can also initiate the change itself, by enforcing a time limit on passwords or by carrying out instructions from a management server for initiating a password change. The email client can also receive an indication from the email service that the old password no longer works, and thereby prompt the user for a new password.

At stage 830, the client device can request a credential update at the notification server by accessing an API of the notification server. The request can include a user identification, such as an email hash string, an email address that the notification server can use for auto-discovery of the corresponding email service, and encrypted versions of the username and new password. An encrypted version of the notification-service token can also be provided. The encrypted items can be encrypted with a public key as described previously.

At stage 840, the notification server can unregister the email-service subscription for the user corresponding to the user identification. For example, the notification server can remove the webhook at the email server pointing to the callback URL. The notification server can then re-register the subscription, using the new credentials, at stage 850. This can include setting a new webhook at the email server that points to a new callback URL. The new callback URL can include the new credentials in encrypted format embedded into the URL. At stage 860, the notification server can update a record stored at the database to reflect the updated user credentials.

FIG. 9 provides a flowchart of an example method for handing a change notification received at a notification server. The example method presumes that the notification server has subscribed to a particular email account on behalf of a user. At stage 920, the change notification is received at the notification server. Receiving the change notification can include, for example, receiving a communication at a callback URL. The callback URL can be specified by a webhook set at the email server that instructs the email server to send a communication to the callback URL in the event of a change in the user's email account folder.

Having received the communication at the callback URL, at stage 930 the notification server can extract a user identification and encrypted credentials from the callback URL. In one example, the callback URL includes separate fields dedicated to the user identification and encrypted credentials, respectively. The notification server can use the user identification to locate a record corresponding to the user and stored in a database. At stage 940, the notification server can obtain information from the located record, such as a private key for decryption and a notification-service token to be used for configuring a notification service. The private key can then be applied to decrypt the encrypted credentials.

At stage 950, the notification server can use the decrypted user credentials to fetch new email information from the email service. This stage can involve accessing the email service and providing decrypted user credentials to gain access to the user's email account. The notification server can compare the state of the user's email account to a previous state, detecting any changes such as new messages, deleted messages, receiving meeting invitations, and so on. The notification server can then determine whether the detected changes are a type of change that should prompt a push notification. For example, a deleted email need not prompt a push notification, while a newly received email should result in a push notification.

At stage 960, the notification server can cause a push notification to be sent to the client device. In some examples, the notification server can push the notification directly to the device. In other examples, it can utilize a notification service, such as APNS, the deliver the push notification to the device. If the notification service only authorizes certain providers to generate push notifications, the notification server can utilize an intermediary server with access rights to the notification service. For example, the notification server can deliver instructions to a cloud notification server with access rights to a notification service, and the cloud notification server can instruct the notification service to push the notification to the device. The process can then end and the device is free to contact the email service directly to retrieve the new email or otherwise update its email information on the client device.

FIG. 10 depicts a system with components for performing the various methods, process, and stages described above. The system can include a client device at 1310. The client device 1310 can be any type of computing device, such as a phone, tablet, watch, laptop, or desktop computer. The client device 1310 can include a processor and memory storage. It can also communicate via a network, such as the internet, in wired or wireless fashion, using one or more components associated with the device. The client device 1310 can include or more email clients, include one or more third-party email clients that are not developed by the device manufacturer. An example of such an email client is VMWARE's BOXER application.

The client device 1310 can communicate with a notification server 1320 as described above. The notification server 1320 can be a single server or a network of servers that include one or more processors and memory storage locations. The notification server 1320 can also include one or more databases that are accessible to the notification server 1320.

The client device 1310 can also communicate with an email service 1330. For example, an email client on the device 1310 can access the email service 1330. The email service 1330 can include one or more physical hardware servers that store email information for the user's email account. For example, the one or more servers can include a username and password, a database storing the emails associated with the user's account, and various settings for the account. These settings can include a webhook, established by the notification server 1320, defining a callback URL at which the email service 1330 can provide change notifications. In one example, the email service is a MICROSOFT EXCHANGE server, a MICROSOFT EXCHANGE WEB SERVICES server, or a combination of both. The email service 1330 can deliver emails directly to the device 1310. In some examples, the email service 1330 stores new emails until the device 1310 reaches out to the service 1330 to request an email synchronization, at which point new emails can be transmitted to the device 1310.

A push notification service 1350 can be utilized for pushing notifications to the client device 1310. The notification service 1350 can be a server, or network of servers, provided by an OEM and configured to deliver notifications to specific applications on specific devices 1310. An example notification service 1350 is APNS (APPLE NOTIFICATION SERVICE). The notification service 1350 can utilize notification-service tokens, such as APNS tokens, to authenticate the applications and devices.

In some examples, the notification service 1350 only authorizes certain providers to generate push notifications. For example, a provider can be required to provide requests in a particular format, encrypt the requests in a particular manner, and include a notification-service certificate or token with the requests. The provider can also be required to include provider-specific authentication credentials in order to utilize the service 1350. In some examples, the notification server 1320 can act as an authorized provider and utilize the notification service 1350.

In other examples, however, the notification server 1320 is not an authorized provider and can therefore utilize an intermediary server, such as the cloud notification server 1340 of FIG. 10. The cloud notification server 1340 can be a single server or a network of multiple servers with permission to send notification requests through the push notification service 1350. In some examples, the cloud notification server 1340 is controlled by an EMM provider that also controls the notification server 1320. A push notification can therefore be routed from the notification server 1320 to the cloud notification server 1340, which then routes the notification to the push notification service 1350. The push notification service 1350 can authenticate both the cloud notification server 1340 and the particular client device 1310 (and email client executing on the client device 1310) before pushing the notification to the device 1310.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for processing email notifications at a server, comprising:
    generating a callback Uniform Resource Locator (URL) that includes at least a portion of a user's email credentials in encrypted form;
    requesting, from an email server, notifications for the user's email account to be provided at the callback URL;
    receiving a notification from the email service at the callback URL;
    decrypting the credentials in the callback URL; and
    fetching email information from the email service using the decrypted credentials.

2. The method of claim 1, further comprising deleting the decrypted credentials from the server after fetching the email information from the email service.

3. The method of claim 1, further comprising sending a notification, reflecting at least a portion of the fetched email information, to a client device associated with the user.

4. The method of claim 3, wherein sending the notification to the client device comprises instructing a notification service to send the notification the client device.

5. The method of claim 1, wherein the callback URL comprises an identification field that identifies the user.

6. The method of claim 1, wherein the server stores a private key and an associated user identity corresponding to the private key.

7. The method of claim 1, wherein the user's email credentials comprise at least one of a certificate and a token.

8. A non-transitory, computer-readable medium comprising instructions that, when executed by a processor of a computing device, perform stages for processing email notifications, the stages comprising:

generating a callback Uniform Resource Locator (URL) that includes at least a portion of a user's email credentials in encrypted form;

requesting, from an email server, notifications for the user's email account to be provided at the callback URL;

receiving a notification from the email service at the callback URL;

decrypting the credentials in the callback URL; and fetching email information from the email service using the decrypted credentials.

9. The non-transitory, computer-readable medium of claim 8, the stages further comprising deleting the decrypted credentials from the server after fetching the email information from the email service.

10. The non-transitory, computer-readable medium of claim 8, the stages further comprising sending a notification, reflecting at least a portion of the fetched email information, to a client device associated with the user.

11. The non-transitory, computer-readable medium of claim 10, wherein sending the notification to the client device comprises instructing a notification service to send the notification the client device.

12. The non-transitory, computer-readable medium of claim 8, wherein the callback URL comprises an identification field that identifies the user.

13. The non-transitory, computer-readable medium of claim 8, wherein the server stores a private key and an associated user identity corresponding to the private key.

14. The non-transitory, computer-readable medium of claim 8, wherein the user's email credentials comprise at least one of a certificate and a token.

15. A system for processing email notifications, comprising:

a memory storage including a non-transitory, computer-readable medium comprising instructions; and a computing device including a processor that executes the instructions to carry out stages comprising:

generating a callback Uniform Resource Locator (URL) that includes at least a portion of a user's email credentials in encrypted form;

requesting, from an email server, notifications for the user's email account to be provided at the callback URL;

receiving a notification from the email service at the callback URL;

decrypting the credentials in the callback URL; and fetching email information from the email service using the decrypted credentials.

16. The system of claim 15, the stages further comprising deleting the decrypted credentials from the server after fetching the email information from the email service.

17. The system of claim 15, the stages further comprising sending a notification, reflecting at least a portion of the fetched email information, to a client device associated with the user.

18. The system of claim 15, wherein sending the notification to the client device comprises instructing a notification service to send the notification the client device.

19. The system of claim 15, wherein the callback URL comprises an identification field that identifies the user.

20. The system of claim 15, wherein the server stores a private key and an associated user identity corresponding to the private key.

* * * * *